F. C. PFEIL.
SIGNALING DEVICE FOR AUTOMOBILES AND OTHER VEHICLES.
APPLICATION FILED NOV. 15, 1916.
1,274,769.
Patented Aug. 6, 1918.
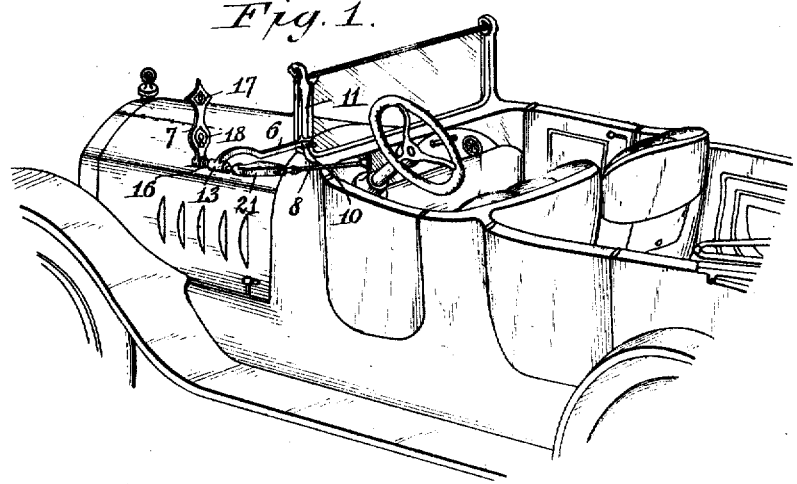
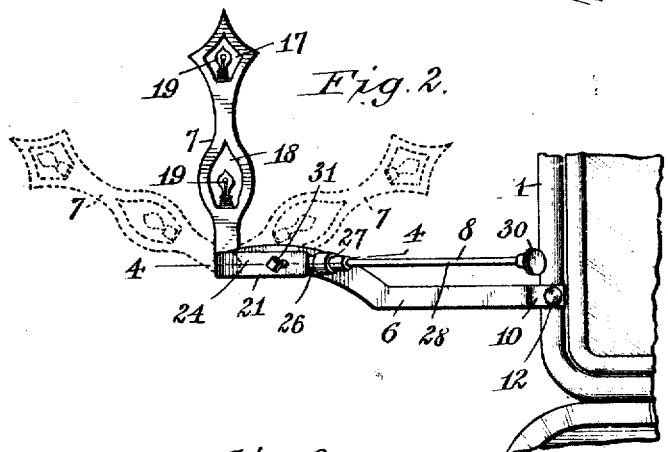
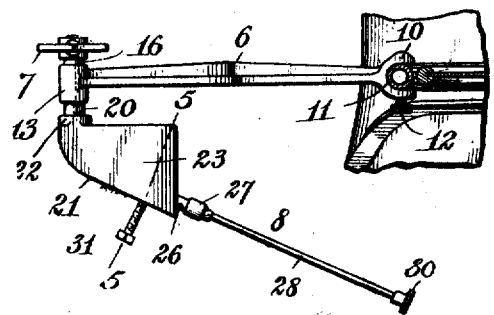
Frederick C. Pfeil, Inventor.
By Emil Heubach, Attorney.
Witness:
Jacob Obrist Jr.

UNITED STATES PATENT OFFICE.

FREDERICK C. PFEIL, OF BUFFALO, NEW YORK.

SIGNALING DEVICE FOR AUTOMOBILES AND OTHER VEHICLES.

1,274,769.   Specification of Letters Patent.   Patented Aug. 6, 1918.

Application filed November 15, 1916.   Serial No. 131,408.

*To all whom it may concern:*

Be it known that I, FREDERICK C. PFEIL, a citizen of the United States, residing at Buffalo, in the county of Erie and State of New York, have invented certain new and useful Improvements in Signaling Devices for Automobiles and other Vehicles, of which the following is a specification.

This invention refers to improvements in automobile signaling devices for signaling or indicating the direction which a chauffeur or other occupant in control of the automobile intends to take, thus notifying vehicles following, and vehicles as well as persons ahead, whether the automobile is to travel in a straight course or turn to the right or left. By the use of such device a timely warning is given to those likely to interfere with the travel of the automobile and thus accidents be avoided. This is particularly desirable at turns or bends in streets or highways and at intersections of streets, and when operating the device a distance from the point at which the change in direction of the automobile is to be made, it will not be necessary to reduce the speed as a matter of safety, since the device will protect the automobile against injury from other vehicles, the occupants of which have been given a timely warning of the intention of the chauffeur or other occupant in control of the automobile.

In accordance with my invention the signal is placed so that it is easily seen from the front as well as the rear and may be conveniently operated from the position which the person in charge of the car occupies, and it is moreover detachable so that it may be placed at any other point of the automobile to be operated by another party who may accompany the chauffeur or person operating the automobile.

One of the objects of this invention is to provide a signaling device having an indicating arm normally positioned vertically to indicate that the automobile is to continue in a straight course, and which arm is adapted to be swung either to the right or left from the normal vertical position thereof to indicate a change in the course of the automobile and the direction in which the automobile is to be driven.

Another object of my invention is the provision of a signaling device having a signaling arm pivotally mounted in a bracket detachably secured to the windshield or some other part of the automobile and extending outwardly from the point of attachment a sufficient distance to bring said signaling arm into view from any point at the rear in which another vehicle may be traveling, the occupants of which should know the intended course which the automobile is to take, and to provide simple means for manipulating said arm.

A further object is to provide a signaling device of this kind having a suitable supporting-member, a signaling arm mounted in said supporting-member to oscillate, a rigid manipulating-member connected axially to the hub of said arm by a flexible member bent so that the manipulating member may be directed inwardly toward the operator.

Further objects are to provide a simple, inexpensive and durable device of this kind having few parts and being provided with means whereby the manipulating member may be adjusted to bring the same to the most convenient position for operation, and to otherwise improve on signaling devices of this kind now in use.

To these ends the invention consists in a movable signaling arm which has its axis at a right angle to the length of the arm and parallel or substantially parallel with the length of the automobile, in securing a flexible connector member axially to said arm, and in providing a manipulating member arranged obliquely to a plane passing longitudinally through the axis of said arm and having connection with said connector member.

It further consists in providing a support in which a signaling arm is journaled for oscillating movement and in which a carrier member is secured which has a supporting part of extended area, a manipulating member receiving support from said supporting part and adjustable to permit it to assume different positions on said supporting part, and a flexible connection in the form of a wire cable or the like comprising numerous strands of wire and connecting said signaling arm with said manipulating member.

It further consists in the novel arrangement of parts, in the novel construction of parts, and in the combination of elements to be hereinafter set forth and particularly pointed out in the subjoined claims.

In the drawings,—

Figure 1 is a perspective view of a portion of an automobile having my improved signaling device attached to the left hand end of the wind-shield.

Fig. 2 is a rear view of the device applied to the wind-shield, a portion only of the wind-shield and the adjacent portion of the cowl or dash being shown.

Fig. 3 is a plan view of the signaling device, with the wind-shield to which it is attached shown in horizontal section and a portion of the cowl or dash in plan view.

Fig. 4 is an enlarged horizontal section taken on line 4—4, Fig. 2.

Fig. 5 is a cross section taken on line 5—5, Fig. 3.

The signaling device may be attached in any position on an automobile in which it may be seen from proper points in rear and front, and when applying it to automobiles having the steering wheel at the left side thereof the device is preferably applied to the left hand end of the wind-shield, as shown in the drawings; but in automobiles having the steering wheel at the right, the device will preferably be attached to the right hand end of the wind-shield so that in either case the party operating the vehicle will have convenient access to the device for giving the proper signals.

The preferred embodiment of my invention comprises, broadly considered, a support 6, a signaling member 7, a manipulating member 8, and a connector member 9 by means of which the manipulating member is operatively connected with the signaling member.

The support 6 is in the form of an elongated arm or bracket which may be constructed of any metal or alloy, preferably aluminum, and having at its inner end a U-shaped or forked portion 10 adapted to embrace the vertical bar 11 of the wind-shield frame, a set screw 12 being threaded through one of the sides of said U-shaped or forked portion to impinge tightly against said vertical bar and secure said supporting arm or bracket detachably but firmly in position. The outer portion of said supporting arm or bracket is offset, preferably curved upwardly, as shown, and at its outer end it has a boss 13 provided with a central bore 14 internally threaded at one end, as at 15, the other end of said bore being left smooth to act as a journal for a stub shaft or stud 16 arranged at the lower or inner end of the signaling member 7, said stub shaft or stud being arranged at a right angle to the body portion of said signaling member, which latter may be formed of any suitable material, but preferably material of light weight.

The signaling member 7 is in the form of an arrow and has spaced openings 17, 18 therein. In each of these openings a small incandescent lamp 19 is positioned, the lamp in one of said openings being of a different color than the other, and suitable electric current-conducting means (not shown) are provided for conducting the current to these lamps, it being within the skill of any practical electrician to attach the current-conducting means to this device. By having lamps of two different colors within the signaling arm, the position of the arm can readily be determined in the dark by persons in front or rear and the direction in which the vehicle is to travel will be visual at all times.

In the threaded portion of the bore 14 a nipple 20 is threaded, said nipple extending rearwardly from the boss of the supporting arm or bracket and having its rear end threaded, onto which a carrier member 21 is threaded. Said carrier member is in the form of a casting of aluminum or other suitable material and has a boss 22 which is threaded to receive the rear threaded end of said nipple and two flat rearwardly and inwardly-directed members 23 which are spaced apart and connected along two of their marginal portions by an edge wall 24, thus forming a deep channel open at the front and inner edges of the carrier member and having the outer and rear edges closed by said edge wall. The flat members 23 are comparatively wide to provide large surfaces or areas, and between these members is arranged one end of the manipulating member 8. This manipulating member is connected to the flexible connector member 9, as at 25, said flexible connector member being a short length of wire cable formed of strands of small wires assembled in the usual manner. This cable extends outwardly and thence forwardly and passes with its forwardly extending portion through the nipple 20, through the bore 14 and into the stub shaft or stud and the hub of the signaling member 7, it being pinned or otherwise fastened to said member, as best shown in Fig. 4. As clearly shown in said figure, this length of wire cable is bent between the rear end of the nipple 20 and the adjacent end of the manipulating member 8 and is rotatable so as to cause the signaling arm secured thereto to swing from vertical position to either of the dotted positions shown in Fig. 2, or from any one position indicated to any other.

Since the bore 14 at the outer end of the supporting arm or bracket is somewhat larger than the connector member 9, the nipple 20 serves as the only direct journal for said connector member, although the bore serves indirectly as a journal for said connector member due to the fact that the stub shaft or stud 16 surrounding said connector member is journaled in said bore and moves with said connector member.

The manipulating member 8 is arranged at an acute angle to the axis of the signaling member, and since by rotating said manipulating member the signaling member is caused to oscillate, the connector member 9 may also be termed a direction-changing member. As a simple and inexpensive means of construction, the manipulating member comprises a short length of pipe 26 into one end of which the cable serving as the connecting member is pinned or otherwise secured, the opposite end of said pipe 26 being threaded and projecting beyond the inner open end of the carrier member 21. A reducer 27 is threaded onto said projecting end and a rod 28 threaded into the reducer, said rod being continued inwardly to a point in close proximity to the steering wheel 29 of the steering mechanism of the automobile so that the operator may conveniently manipulate the device for indicating the direction of travel without interfering with the steering of the automobile.

The inner end of the rod is preferably provided with a knob 30, or other suitable handle, so that the rod may be conveniently turned. That end of the manipulating member arranged within the supporting member I will, for convenience, term the outer end thereof, and this end is positioned between the two flat members 23 while the upper flat member serves as a retainer member and prevents upward deflection thereof, which would otherwise be possible due to the cable serving as the connector member being able to bend in any direction. The manipulating member is therefore confined to a slight rotary movement and movement forwardly and backwardly between the two flat members 23, and it may be positioned and retained at different angles between the two flat members 23 so as to bring the inner or handle end thereof into the desired position for the operator; this being accomplished by a set screw 31 threaded through the edge wall 24 and bearing against the short length of pipe at the outer end of the manipulating member. For this purpose the flat members 23 are made comparatively wide so that in cases where the point of attachment of the device to the car is farther in rear than that shown in the drawings, it may be desirable to have the manipulating member assume the position shown in dotted lines in Fig. 4, or some position between that shown in solid lines and that shown in dotted lines, therefore the extended area provided by the lower flat member 23, assures proper support for the manipulating member, regardless of the position the latter may be in.

While the signaling member is shown in Fig. 2 as adapted to swing in an arc of a circle less than 180 degrees, it is of course understood that this is controlled entirely by the operator, and when signaling a turn to the right the signaling arm may be swung to the right into horizontal position, or when signaling that a turn is to be made to the left, said arm may be swung to the left into horizontal position, and for this reason the outer end of the supporting arm or bracket is curved upwardly so that when swung to the right the signaling arm will still be in view from the rear and not be entirely hidden by the supporting arm or bracket; it is not, however, found necessary in practice to swing said arm to horizontal position since any position to the left or right of the vehicle will clearly indicate the direction to be followed.

It is to be noted that by swinging the signaling member into a vertical plane, it is at all times in view from the front and from the rear, whether swung to indicate a turn to the right or left, or whether swung into a vertical position to indicate a straight course ahead. This is a decided advantage over signaling devices in which the signaling member is swung horizontally, since in such cases the signaling member is invariably hidden in one of its positions either from the front or the rear.

My invention is susceptible to changes in construction and minor details of arrangement without departing from the spirit of the same or sacrificing any advantages thereof.

Having thus described my invention, what I claim is,—

1. A device of the kind described, comprising a support, a signaling arm journaled to swing in said support, a carrier member connected to said support and having two flat spaced members, a manipulating rod extending into the space between said two flat members, a flexible connector connected to said rod and having connection axially with said signaling arm, said flexible connector being bent to position said manipulating rod at an angle to the axis of said signaling arm, and means for adjusting the position of said manipulating rod to change the angle thereof and for retaining said rod in adjusted position.

2. A device of the kind described, comprising a support, a swinging element mounted in said support and serving as a signaling member, a carrier member supported from said support and comprising two flat members spaced apart and directed rearwardly and inwardly, said flat members being connected at their outer and rear edges by an edge wall, a manipulating rod positioned between said flat members and receiving support from the lower flat member, and a wire cable connecting the outer end of said manipulating rod with the signaling member at its axis.

3. A device of the kind described, comprising a support, a swinging element mounted in said support and serving as a signaling member, a carrier member supported from said support and comprising two flat members spaced apart and directed rearwardly and inwardly, said flat members being connected at their outer and rear edges by an edge wall, a manipulating rod positioned between said flat members and receiving support from the lower flat member, a wire cable connecting the outer end of said manipulating rod with the signaling member at its axis, and a set screw passing through said edge wall and bearing against said manipulating rod for the purpose of adjusting and retaining said rod in the desired angular position with reference to the axis of said signaling member.

4. A device of the kind described, comprising a support, a signaling arm mounted in said support for swinging movement, a carrier member in rear of said support having a flat horizontally-disposed supporting member, a nipple connecting said carrier member with said support, a manipulating rod receiving support from said flat supporting member, and a wire cable connected to said manipulating rod and passing through said nipple, said cable being axially connected to said signaling arm and journaled in said nipple and being also curved between said nipple and said manipulating rod to position the latter at an angle to the axis of said signaling arm.

5. A device of the kind described, comprising a support adapted for detachable connection to a fixed part of an automobile and extending outwardly therefrom, a signaling arm having a hollow boss or stub shaft journaled in said support for swinging movement, a carrier member connected to said support and extending rearwardly and inwardly from its point of connection thereto, and a manipulating member having a flexible portion axially connected to said signaling arm and adapted to permit of positioning the remaining portion thereof at an angle to the axis of said signaling arm.

6. In a device of the kind described, an elongated supporting arm adapted for detachable connection to a fixed part of an automobile so as to extend therefrom, the outer end of said arm having a bore smooth at its front end and internally threaded at its rear end, a signaling arm having a hollow stud or stub shaft journaled in the smooth portion of said bore, a nipple having its front end threaded into the threaded portion of said bore and having its rear end externally threaded, a carrier member having two flat spaced members, an internally threaded boss between said flat members at their outer front corners and an edge wall connecting said flat members and extending rearwardly and inwardly from said boss, said boss being threadedly connected to the rear end of said nipple, a wire cable having one end secured in the hollow stud or stub shaft of said signaling arm and extending rearwardly through said nipple into the space between the flat members of said carrier member, a manipulating rod having its outer end positioned between said flat members and connected to the other end of said wire cable, and a set screw threaded through the edge wall of said carrier member and adapted to bear against said manipulating rod to position and retain the same at the desired angle to the axis of said signaling arm.

7. A device of the kind described, comprising a supporting member, a signaling arm adapted to swing and having a horizontal axis, and manipulating means extending inwardly at an angle to said axis and adapted for rotary movement, said manipulating means and signaling arm being both supported by said supporting member.

8. The combination with a vehicle, of a support extending outward laterally therefrom, a signaling member adapted to swing in a vertical plane and having its axis in the direction of the length of said vehicle, and an operating element for swinging said signaling member extending inwardly obliquely to the plane of said axis.

In testimony whereof I affix my signature.

FREDERICK C. PFEIL.